United States Patent [19]
Decker

[11] 3,947,258
[45] Mar. 30, 1976

[54] VAPOR STRIPPING AND RECOVERY METHOD AND APPARATUS

[75] Inventor: Robert W. Decker, Hopewell, N.J.

[73] Assignee: Ingersoll-Rand Company, Woodcliff Lake, N.J.

[22] Filed: May 25, 1972

[21] Appl. No.: 256,725

[52] U.S. Cl. ..................................... 55/88; 62/54
[51] Int. Cl.² ....................................... B01D 47/00
[58] Field of Search ............... 55/88, 89; 62/54; 220/85 VR, 85 VS

[56] References Cited
UNITED STATES PATENTS

| | | | |
|---|---|---|---|
| 2,935,375 | 5/1960 | Boucher | 55/257 |
| 2,947,379 | 8/1960 | Aubrey | 55/88 |
| 3,613,333 | 10/1971 | Gandenier | 55/89 |
| 3,648,436 | 3/1972 | Schonewald et al. | 55/88 |
| 3,714,790 | 2/1973 | Battey | 62/54 |
| 3,733,838 | 5/1973 | Delahunty | 62/54 |

OTHER PUBLICATIONS

Perry, Chemical Engineers' Handbook, Fourth Edition, Section 11, p. 36 (1963).
Kirk–Othmer, Encyclopedia of Chemical Technology, Second Edition, Vol. 7, pp. 204, 205, (1965).
Burns et al, Physics, Second Edition, pp. 269, 270 (1943).

*Primary Examiner*—Charles N. Hart
*Attorney, Agent, or Firm*—Bernard J. Murphy

[57] ABSTRACT

An air-vapor mixture, derived from a vaporous, volatile liquid, has vapors stripped and recovered therefrom, in accordance with the method and apparatus, by first stripping a multi-component vaporous, volatile liquid of at least some of its more volatile constituents and then contacting the air-vapor mixture with a stream of the stripped liquid. Leaning or stripping of the contacting liquid provides an unburdening of cooling means which, selectively, are subsequently deployed to effect vapor absorption condensation. Thus the method and apparatus offer economies in cooling equipment and overall greater efficiency in the liquid absorption. In one embodiment, a jet inductor is used to spray volatitle liquid into the mixture to partially strip the liquid of its more volatile fractions. An embodiment of a sub-combination apparatus comprises means for stripping a vaporous, volatile liquid of vapor, and either storing the vapor-stripped liquid for subsequent use, or continuously using liquid thus vapor-stripped, in vapor stripping and recovery apparatus. The sub-combination apparatus obviates the use of a jet inductor or like devices toward vapor-stripping the volatile liquid as an optional practice of the invention.

31 Claims, 4 Drawing Figures

VAPOR STRIPPING AND RECOVERY METHOD AND APPARATUS

This invention pertains to methods and apparatus for removing vapors from an air-vapor mixture derived from a vaporous, volatile liquid which is exposed to air, and in particular to such methods and apparatus which cause the vapors to be absorbed and collected by a liquid medium, and to such methods and apparatus which, selectively, further employ cooling of the mixture to effect absorption and condensation of the vapors thereof.

Further, the invention also pertains to methods and apparatus for vapor-stripping a vaporous, volatile liquid.

In the prior art, it is already known to cool the air-vapor mixture to cause the vapors to condense or to be absorbed, and to collect the resulting liquid. It is known also, in this art, to conduct such an air-vapor mixture through absorbers so that the vapors might collect therein and be separated out for reclamation. Further, one known prior teaching, U.S. patent application Ser. No. 22,880, filed 26 Mar. 1970, for a "Gasoline Vapor Recovery" system and method, by Applicants Roger L. Schonewald and Victor Kevorkian, sets forth apparatus and method in which vapors are recovered through a combination of condensation and absorption. The referenced co-pending case also employs cooling to effect absorption and condensation of the vapors and subsequently collects the condensate.

In the referenced case, Ser. No. 22,880, and in all known prior art, the cooling means —comprising a refrigeration subsystem of some type— has to have considerable cooling range or, alternatively, the pressure of the air-vapor mixture must be elevated to promote absorption and/or condensation. However, and whatever, refrigerant is applied to condense the vapors, the same needs to be at a relatively low temperature if it will be effective, and efficiently produce condensate. Cooling or refrigerating means which must generate low temperatures are expensive. Very simply, it is advantageous, from the standpoints of economy and efficiency, to be able to use cooling or refrigerating means for condensing vapors of an air-vapor mixture which need not generate such relatively low temperatures.

Additionally, in the prior art, stripping of vapors from an air-vapor mixture is effected by a counterflow contacting of the mixture with a flow —preferably a shower— of a vaporous, volatile liquid. In this, the showering is to absorb vapor. However, such liquids put to this use, taken from standing supply, are given to dispersion of their own vaporous light ends, in the showering process. Depending upon the concentration of light ends therein, then, such supplied liquids are relatively inefficient in absorbing and reclaiming the object vapors of the air-vapor mixture with which they come in contact. Again, to enhance the absorbing/reclamation efficiency of the liquid, it has been necessary to use very heavy capacity refrigerating units to greatly chill the liquid and inhibit its vaporization. A less expensive and more efficient approach to the problem would be to "pre-condition" the liquid, in a novel way, to render it more absorbent.

It is an object of this invention to set forth an improved method and apparatus for stripping and recovering vapors. It is another object of the invention to set forth a method and apparatus which provide the economies and efficiencies referenced in the foregoing. Further, it is an object of this invention to teach a method of stripping and recovering vapors from an air-vapor mixture generated by a vaporous, volatile liquid which is exposed to air, comprising the steps of stripping a vaporous, volatile liquid of at least some of its more volatile constituents and contacting the air-vapor mixture with a stream of the stripped, volatile liquid, to cause the mixture to give up vapors to the stripped, now less volatile liquid. It is another object of this invention to set forth apparatus for stripping and recovering vapors from an air-vapor mixture generated by a vaporous, volatile liquid which is exposed to air, comprising means for producing a flow of the vaporous, volatile liquid; means for stripping vapors from the flowing liquid; and means for contacting the mixture with the vapor-stripped liquid to cause vapors to be stripped from the mixture and become absorbed by the liquid, including means for conducting the liquid from said flow-producing means to said liquid-vapors stripping means; and means for conducting the vapor-stripped liquid from said liquid-vapors stripping means to said contacting means.

Another object of this invention is to set forth a method of vapor-stripping a vaporous, volatile liquid, comprising the steps of vaporizing at least a portion of said liquid, and extracting said vaporized portion.

Still another object of the invention is to disclose an apparatus for vapor-stripping a vaporous, volatile liquid comprising means for vaporizing at least a portion of said liquid, means for admitting said liquid to said vaporizing means, and means for extracting said vaporized portion from said vaporizing means.

A feature of this invention, in one preferred embodiment thereof, comprises the use of a jet inductor to generate a spray of volatile liquid, and the admixture of the spray with the to-be-processed air-vapor mixture to strip the liquid of at least some of its vapors before deploying same in the absorption of vapors of the vapor-air mixture.

Further objects and features of this invention will become more apparent by reference to the following description taken in conjunction with the accompanying figures, in which.

Figure 3:
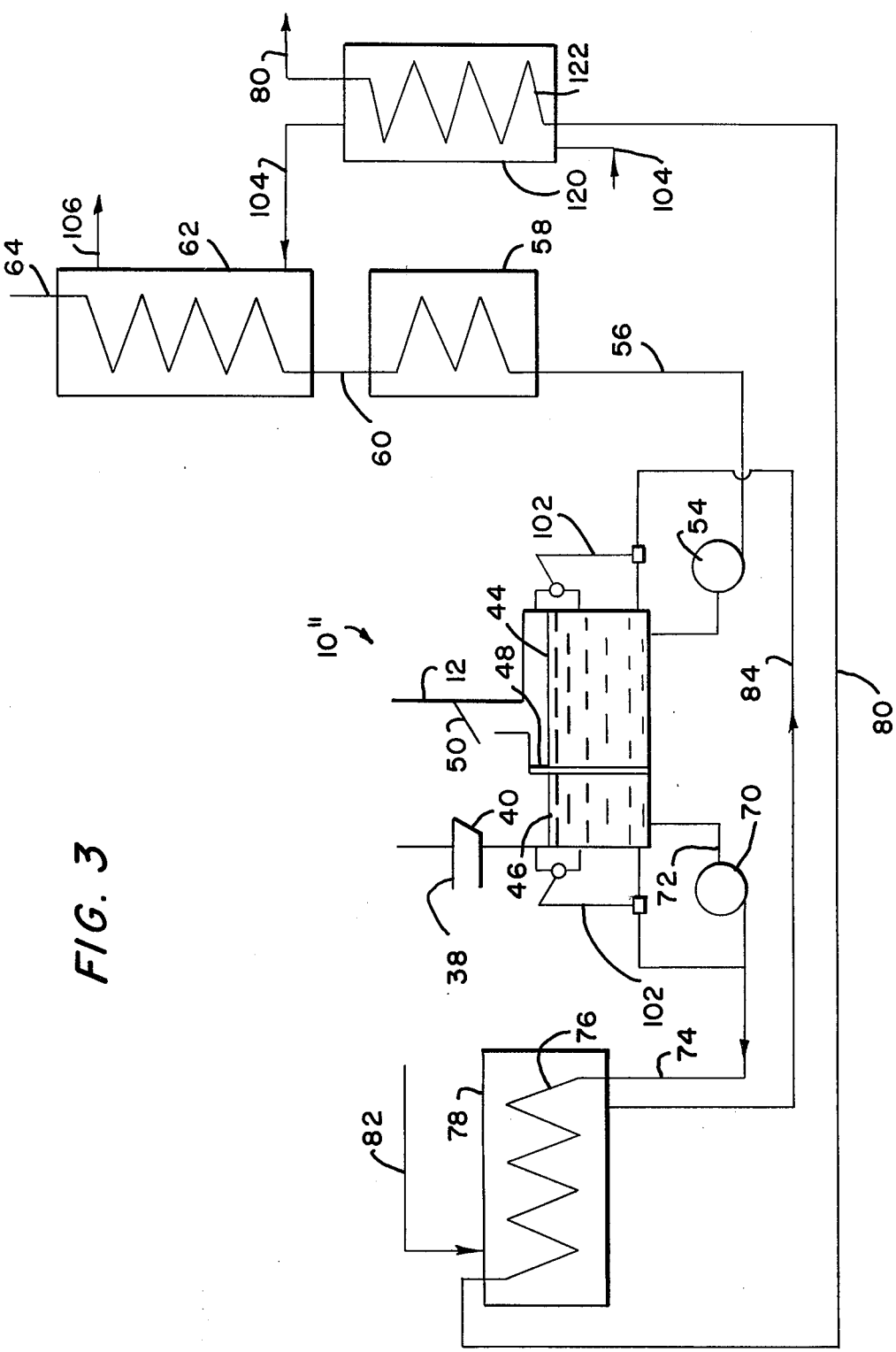
Figure 4:
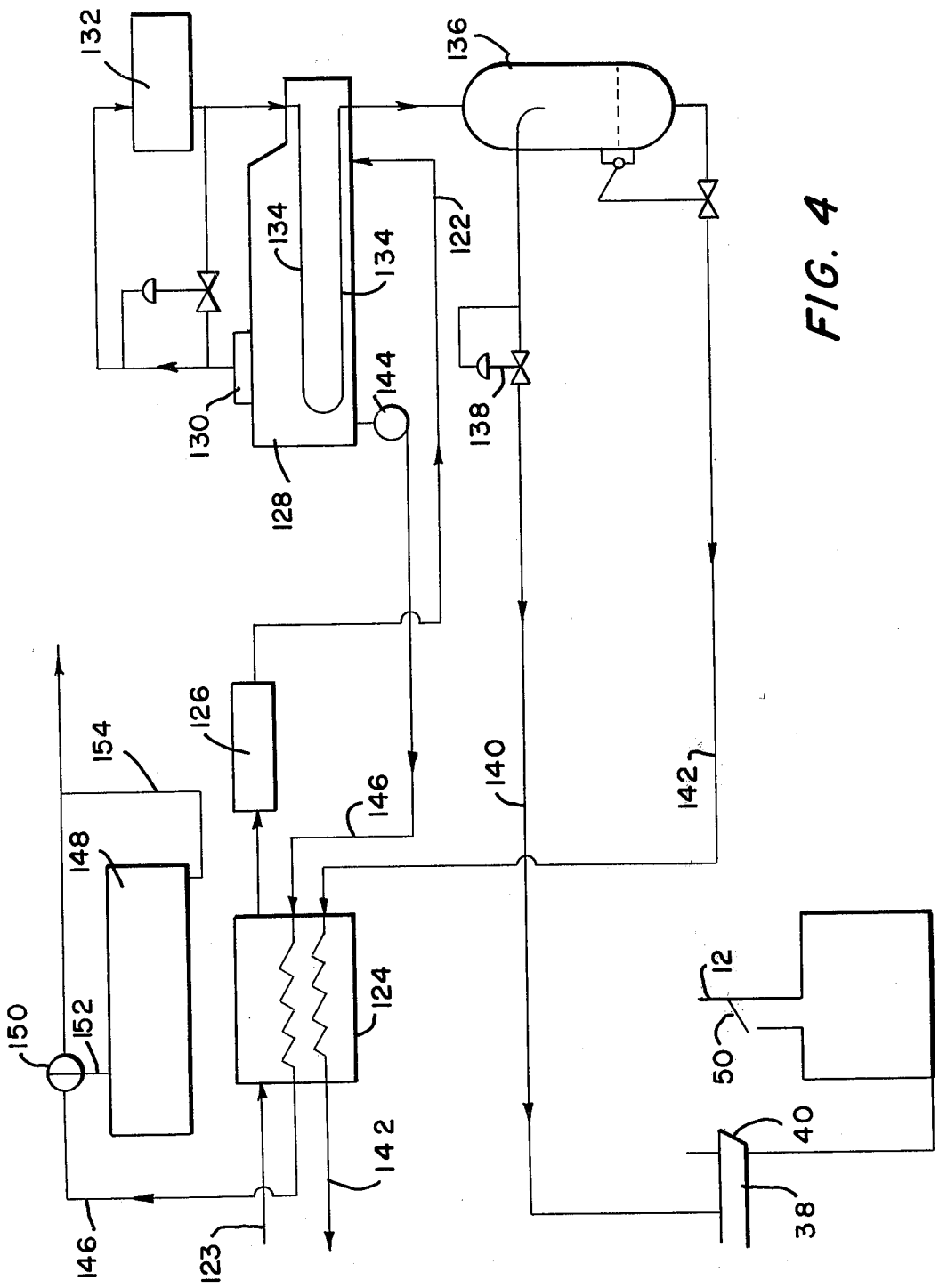

FIG. 3 is a combined pictorial and schematic of a portion of yet another alternate embodiment of the novel vapor stripping and recovery apparatus; and FIG. 4 is a combined pictorial and schematic of an embodiment of a sub-combination apparatus for stripping a vaporous, volatile liquid of vapor for either subsequent or continuous use of the vapor-stripped liquid in vapor stripping and recovery apparatus.

In the figures, same or similar index numbers denote same or similar components of the apparatus in each of the embodiments.

Figure 1:
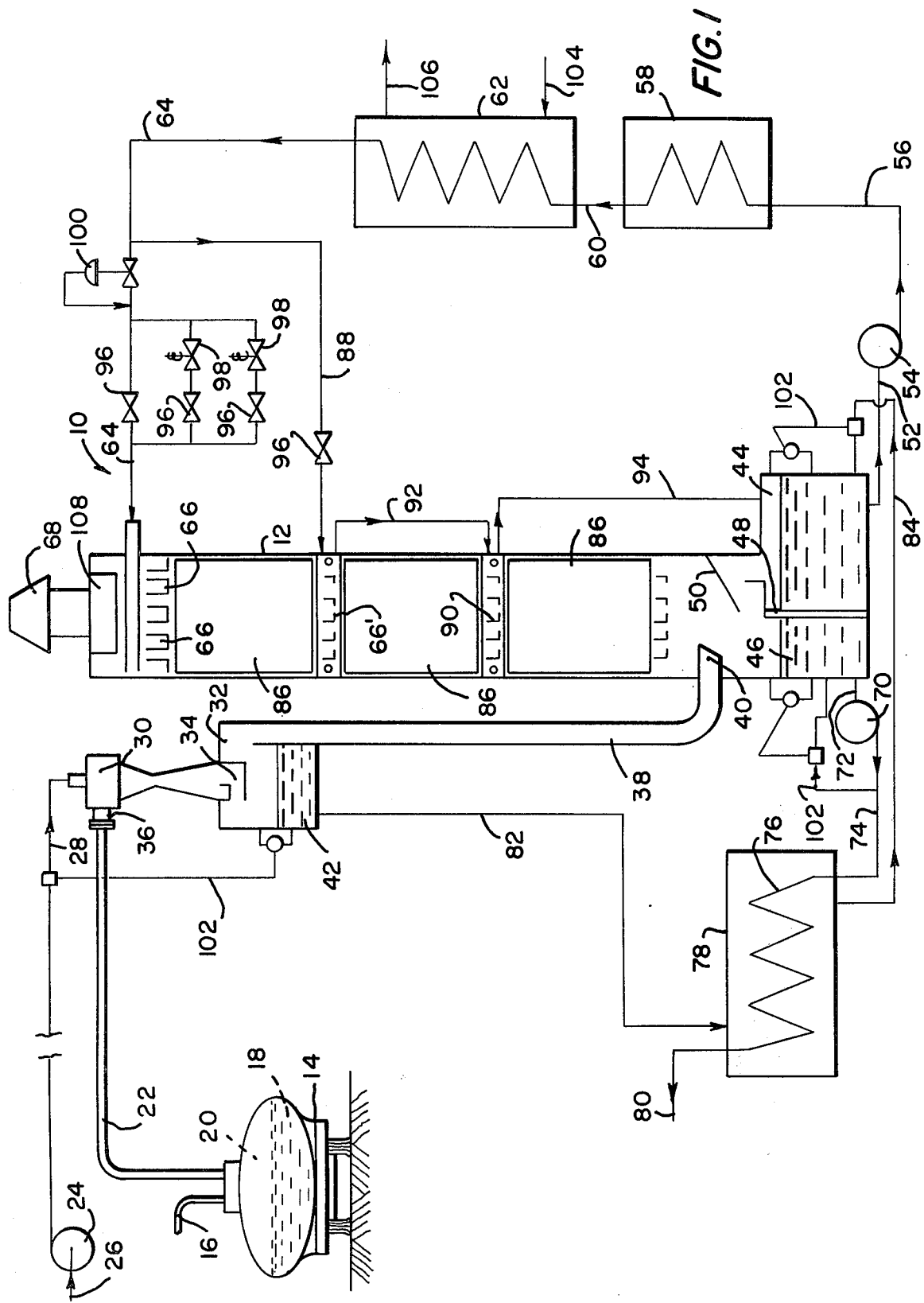
FIG. 1 is a combined pictorial and schematic illustration of an embodiment of a vapor stripping and recovery apparatus, according to the invention.

As shown in FIG. 1, apparatus 10 embodies the invention and comprises a tower 12 into which an air-vapor mixture, derived from a vaporous, volatile liquid, is admitted and in which the vapors are stripped and recovered, the flow of the vapor air mixture being countercurrent to the flow of the liquid. For purposes of illustration, the apparatus 10 will be described and explained in connection with stripping and recovery of gasoline vapors from an air gasoline vapor mixture. It is to be understood, however, that the invention and its teachings are applicable for the stripping and recovery of vapors from any air-vapor mixture derived from a volatile and vaporous liquid which is exposed to air.

A gasoline tanker 14 has a filler pipe 16 coupled thereto through which gasoline is pumped (by means not shown) to fill the tanker. On filling the tanker 14 with gasoline 18, the tanker air space 20 becomes diminished and expels an air-vapor mixture out through a vent pipe 22.

In tower 12 the air-vapor mixture will be chilled, by passing countercurrently through a shower of chilled absorbent — which, in this embodiment, is a refrigerated hydrocarbon liquid derived from gasoline — to cause the vapor to condense and be absorbed.

If ordinary gasoline were used as absorbent, efficient absorption would require a relatively low temperature of the absorbent to provide adequate driving force. On the other hand, a hydrocarbon liquid which contains fewer volatile constituents than the ordinary gasoline would not require such low absorbent liquid temperature to provide adequate absorption driving force.

Thus, my invention teaches the practice of first stripping the absorbent, the raw gasoline, of at least some of the vapors, prior to admittance thereof. While other methods may suggest themselves to those skilled in this art from my teaching, in the embodiment depicted in FIG. 1, I set forth use of a jet inductor.

A pump 24 supplied with gasoline from a reservoir thereof by line 16 pumps gasoline, via line 28, to the aforementioned jet inductor 30. The inductor 30 discharges a spray of gasoline into a receiver 32 which has a baffle 34 at the inlet opening thereof. Vent pipe 22 conducts the air-vapor mixture into the inductor, via an admittance conduit 36 carried by the inductor 30.

The inductor 30 creates a slight vacuum in conduit 36, and the vacuum pulls the air-vapor mixture into the inductor for admixture with the gasoline spray; this insures a vapor-stripping of the sprayed gasoline and, coincidentally, more saturation of the mixture.

The more-saturated mixture is vented from the receiver 32 via a conduit 38 and is conducted to a conduit terminal opening 40 which is confined within the lower end of tower 12. The remainder of the saturating and now stripped spray is collected in a repository 42 in receiver 32.

Tower 12 holds two liquid reservoirs or sumps in the base thereof: "lean" gasoline sump 44 and "rich" gasoline sump 46; a wall 48 separates one from the other, and a depending drain plate 50 insures that any gasoline liquid reclaimed within or recycled through tower 12 will fall only into sump 46.

Sump 44 supplies the showering, refrigerated, stripped gasoline to the tower 12. A line 52 taps liquid gasoline from the sump 44 and, by way of a pump 54, conducts it to a line 56. The latter conducts the stripped gasoline to an electric defrost-type heater 58 wherefrom it is passed through a line 60 into and through a chiller 62. From chiller 62, the now-chilled absorbent i.e. the stripped gasoline, is conducted to the upper end of tower 12, by way of line 64, to a feeder-showering device 66.

The feeder-showering device 66 uniformly distributes a downwardly-directed shower of the absorbent, this stripped gasoline, in counter-flow movement through the more-saturated air-vapor mixture which rises within tower 12 toward a topmost flame arresting outlet cap 68. As the mixture and showering gasoline pass through each other, the mixture-borne vapor is condensed and the condensate descends to the rich sump 46 together with the absorbent gasoline. A pump 70 withdraws the gasoline from sump 46 — such gasoline comprising both the showered and the reclaimed condensate constituents — via a line 72, and pumps the same, via a line 74, into and through the coils 76 of a recuperator device 78. Thereafter, a line 80 conducts the liquid off to storage.

A line 82 taps the now lean or stripped gasoline from the receiver 32 and conducts it, in heat-exchange relationship with coils 76, into recuperator device 78. This stripped gasoline conducted into device 78 supplies the makeup for sump 44. A line 84 taps this gasoline from the device and conducts it into sump 44. In that the sump 44 must have its output refrigerated before the output is showered through tower 12, its heat-exchange with the priorly-refrigerated gasoline from sump 46 in the recuperator device 78 contributes toward the feasible practicality of employing smaller refrigerating components in the apparatus. Accordingly, this heat-exchange, in cooperation with the stripping of the admitted absorbent liquid by means of the jet inductor 30, allows the use of a much higher temperature refrigeration assembly than is possible in prior art vapor stripping and recovery apparatus.

My disclosed apparatus 10, in using showering, chilled and stripped gasoline as the refrigerant, strips and reclaims the gasoline vapors by condensation and absorption. The condensate merges with the liquid particulate or droplets of the showered gasoline and is carried therewith to sump 46. Yet, if desired, packing elements can be interposed in the shower and air-vapor mixture paths to assist in the vapor reclamation. Such packing elements 86 are shown in FIG. 1.

An auxiliary feeder-showering device 66' also can be used, in addition to device 66, intermediate the ends of tower 12, as shown in FIG. 1. For such an auxiliary device, a tap-off supply line 88 is provided. So also, further cooling of the throughgoing air-vapor mixture and the showering, stripped gasoline, intermediate of the tower, can be accomplished with cooling coils appropriately positioned in the tower 12. Such an arrangement is illustrated in FIG. 1 where cooling coils 90 are shown, the same being supplied via line 92 from device 66'. Optionally, the tower can be arranged with a single feeder-showering device such as that of device 66, and the auxiliary device 66' can be supplanted by second cooling coils. A line 94 returns the chilled gasoline to sump 44.

Variable orifices 96 are provisioned to control the "refrigerant" gasoline flow; ambient-temperature-controlled valves 98 automatically adjust the arbitrarily-controlled flow in response to the ambient temperature; and a pressure controlled valve 100 controls the conduct of gasoline to line 66 in response to the pressure of the gasoline in the line by holding a preset pressure at the inlet to orifices 96. This preset pressure may be varied by suitable controls to conform with the air-vapor mixture flow.

Devices 102 are standard, liquid-level controls, which insure an optimum supply of gasoline in repository 42 and in sumps 44 and 46. Lines 104 and 106 supply and remove refrigerant medium to and from chiller 62. A de-mister 108 is secured below outlet cap 68.

Figure 2:
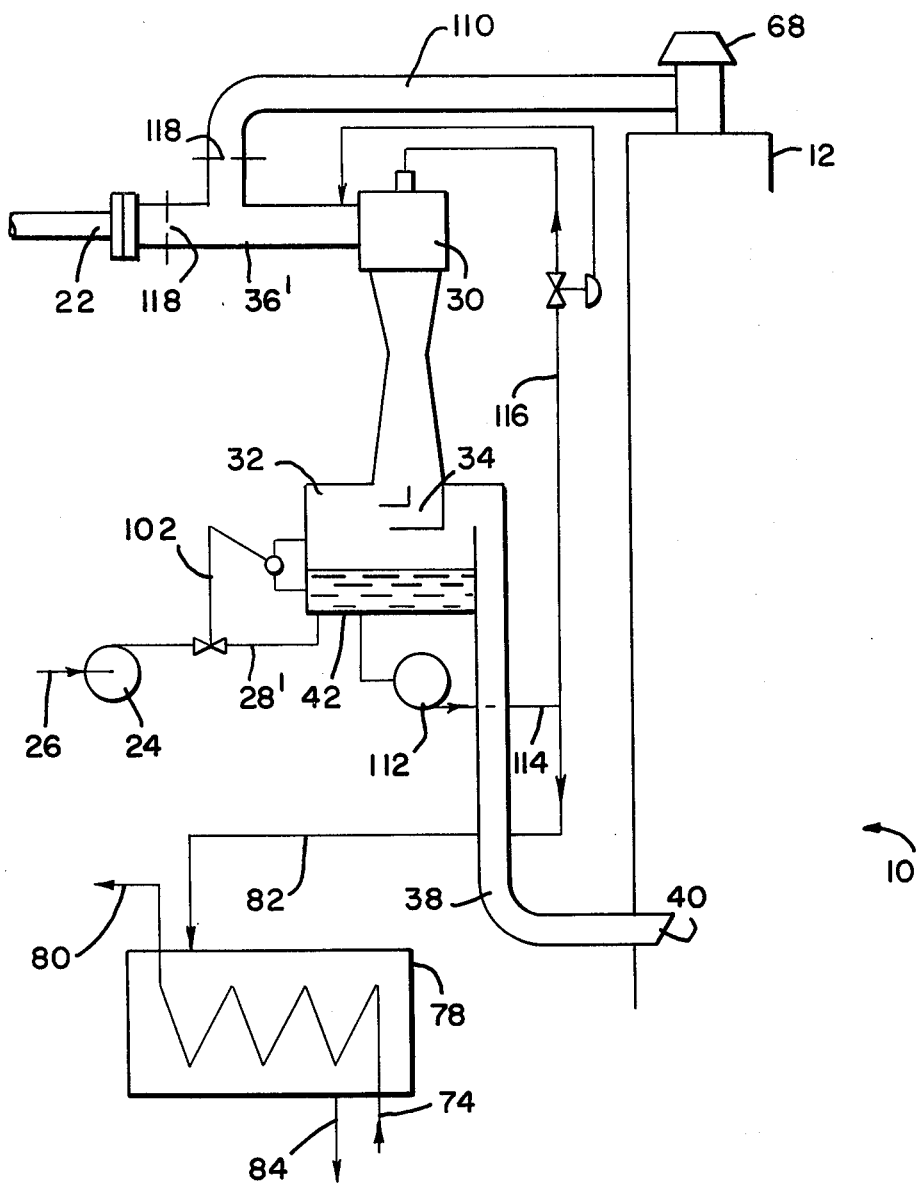
FIG. 2 is a combined pictorial and schematic of a portion of an alternate embodiment of a vapor stripping and recovery apparatus.

Vapor stripping and recovery apparatus known in the prior art, besides having to comprise relatively low temperature cooling or refrigerating assemblies, are burdened in having to handle that which may be a rich air-vapor mixture; i.e., a mixture having high concentrations of vapors of butanes, pentanes, (and the like). Such vapors, the so-called "light ends", are the more difficult to strip and recover from a air-vapor mixture. Thus, all things being equal, the FIG. 1 embodiment of the invention teaches apparatus and a method for more efficiently stripping and recovering vapors from an air-vapor mixture. Yet, as between rich and lean gasoline, the first, FIG. 1, embodiment will less efficiently strip and recover the high concentrations of "light ends" in rich gasoline. For this reason I teach an embodiment of the invention, as illustrated in FIG. 2, which accommodates for the handling of rich air-vapor mixtures. This embodiment, to put it briefly, leans the air-vapor mixture prior to its processing in the inductor 30, pre-conditioning the mixture so that it can more readily accept light ends from, and more efficiently contribute to the stripping of, the gasoline with which it is admixed in inductor 30.

The FIG. 2 embodiment recycles priorly vapor-stripped air through the apparatus 10'. In this apparatus, the stripped air is admixed with the incoming air-vapor mixture. As the stripped air is exceedingly lean (substantially clean), its admixture with the air-vapor mixture serves to lean the latter.

A conduit 110 subdivides the stripped air, which otherwise would all vent out outlet cap 68, and conducts a selected portion thereof to conduit 36'. There it meets and mixes with the air-vapor mixture being admitted via vent pipe 22.

In this embodiment, pump 24 supplies gasoline to receiver 32 (rather than directly to inductor 30, as in the FIG. 1 embodiment) and further pump 112, via a line 114, supplies gasoline from receiver 32 to an inductor input line 116 and to the inlet line 82 of the recuperator device 78.

Orifices 118, in conduit 110, are adjustably variable (by means not shown) to control and regulate the degree of admixture of the air-vapor mixture with the stripped air.

Alternatively, orifices 118 may be replaced by pressure control valves functioning to maintain recycle ratio and/or system suction pressure within boundaries required for particular installations and operations.

To lessen the burden of the refrigerating assembly, the further embodiment shown in FIG. 3 teaches an apparatus and method by means of which inherent cooling can be used to lower the temperature of the refrigerating medium which is supplied via line 104.

As shown in FIG. 3, sub-cooler 120 is operatively interposed in the output line 80, the sub-cooler having coils 122 therewithin through which the gasoline is passed before it goes off to storage. The refrigerant medium supply line 104 is fed into and out of the sub-cooler so that the refrigerant medium will heat-exchange with the storage-directed gasoline. This novel arrangement causes the refrigerant medium to have a lower temperature prior to its admittance to the chiller 62.

The inductor 30, in spraying gasoline, vaporized some of the gasoline into the air-vapor mixture; this inherently causes cooling. Line 82 and 84 heat-exchange this cooler product with the gasoline in line 80, in the recuperator device 78. Thus, the cooling of the refrigerant medium is effected, via line 80, in the sub-cooler 120.

Because many vapor recovery systems must operate with highly varying flow rates of air-vapor mixture, the embodiment of a sub-combination apparatus shown in FIG. 4 comprises means for producing a vapor-stripped, volatile liquid, such as a hydrocarbon liquid, for example, suitable for use as a "leaned" absorbent. The vapor-stripped liquid is generated continuously for use as required by any particular vapor-recovery installation. The supply of lean absorbent is produced by the FIG. 4 apparatus, the latter comprising a single stage compression-distillation system.

As shown in FIG. 4, the raw gasoline is conducted via inlet conduit 123 to and then through a heat-exchange 124, thence through startup heater 126 and to the shell side of a reboiler 128. In reboiler 128 the gasoline is heated under controlled pressure and temperature conditions. This heating produces a boiling and partial vaporization of the gasoline. In this process, the light ends are preferentially vaporized. The generated vapors pass up through a demister element 130 and thence to a compressor 132. The function of the compressor is threefold:

1. To extract the vapors from reboiler 128;
2. To elevate the pressure of the vapors to a point where they will condense at a temperature somewhat higher than that of the boiling gasoline in the reboiler; and
3. To add a small amount of additional energy (heat) so the process will be stable.

After compression, the vapors are conducted to the tube 134 of the reboiler 128 where they are condensed by giving up their latent heat and some of their sensible heat to the boiling raw gasoline. The condensed vapors plus any residual non-condensible material is then conducted to a condensate separator 136 where the non-condensibles are separated from the condensate. The non-condensibles are passed through a pressure control valve 138, via a line 140, and thence to the tower 12 of the basic vapor recovery unit via conduit 38. The condensation (now at higher than ambient temperature) is conducted through heat-exchanger 124, via line 142, and thence to gasoline storage.

The leaned or vapor-stripped liquid leaving the reboiler 128, via pump 144, is conducted through line 146 and through the heat-exchanger 124. Thereafter, the stripped liquid is either sent to reservoir 148 for storage, where it is kept until called for by the basic vapor recovery apparatus 10 (or 10' or 10"), or is continuously supplied to said apparatus. That is, if valve 150 in line 146 is disposed as shown in FIG. 4, the stripped liquid is conducted to inlet pipe 152 of reservoir 148. When and as required, the supply can be taken via outlet line 154. Optionally, however, the stripped liquid can be continuously supplied, via line 146, simply by moving valve 150 to cut off liquid admittance to reservoir 148.

In the apparatus embodiments of FIGS. 1 and 2, the invention comprises the use of a jet inductor 30 toward the stripping of the vaporous, volatile liquid. The sub-combination apparatus, of which FIG. 4 depicts one embodiment for generating a stripped liquid, renders the use of an inductor unnecessary. Accordingly, the invention comprises and contemplates the supplanting of the inductor 30 for a vapor-stripped liquid supply system like that of FIG. 4 as an optional practice of the teaching.

While I have described my invention in connection with specific apparatus capable of practicing the methods, it is to be clearly understood that this is done only by way of example, and not as a limitation to the scope of the invention as set forth in the objects thereof and in the appended claims.

I claim:

1. A method of stripping and recovering vapors from an air-vapor mixture generated by a vaporous, volatile liquid which is exposed to the air, comprising the steps of:
   stripping a vaporous, volatile liquid of at least some of its vapors; and
   contacting the mixture with a stream of the stripped, volatile liquid, to cause the mixture to give up vapors to the stripped, volatile liquid; wherein
   said liquid stripping step comprises vaporizing at least a portion of said liquid and extracting said vaporized portion;
   said vaporizing step comprises boiling said liquid to cause vaporization of said portion; further including the step of condensing the vaporized portion; and wherein said condensing step comprises pressurizing said vaporized portion to cause said portion to condense.

2. A method, according to claim 1, further including the steps of:
   cooling the mixture to cause vapors thereof to condense; and
   collecting the condensate.

3. A method, according to claim 2, wherein the cooling step comprises:
   contacting the mixture with refrigerating means.

4. A method, according to claim 3, wherein the cooling and collecting steps comprise:
   contacting the mixture with a refrigerated absorbent to cause the vapors to be condensed and absorbed by the absorbent.

5. A method, according to claim 4, wherein said absorbent contacting step comprises:
   passing the mixture and the absorbent through each other and includes moving the mixture in a predetermined direction and moving the absorbent in a direction other than said predetermined direction.

6. A method, according to claim 4, wherein said absorbent contacting step comprises:
   passing the mixture and the absorbent through each other in counter-flow directions.

7. A method, according to claim 4, wherein said absorbent contacting step comprises:
   moving the mixture through a shower of the absorbent.

8. A method, according to claim 2, wherein:
   said cooling step comprises cooling the stripped, volatile liquid prior to contacting the mixture therewith, and heat-exchanging the mixture with the cooled, stripped liquid.

9. A method, according to claim 2, wherein:
   said cooling and collecting steps comprise cooling the stripped, volatile liquid prior to contacting the mixture therewith, and then contacting the liquid to cause vapors of the mixture to condense and to be absorbed into and collected by the contacting, stripped liquid.

10. A method, according to claim 2, wherein the cooling step comprises refrigerating the vaporous, volatile liquid after stripping same of at least some of its vapor, and contacting the mixture with the refrigerated, stripped, volatile liquid.

11. A method, according to claim 10, wherein the refrigerating step comprises refrigerating the stripped, volatile liquid in a chiller into which a refrigerant is admitted to effect refrigeration; and further includes
   cooling the refrigerant prior to admittance thereof into the chiller.

12. A method, according to claim 2, wherein the cooling step comprises refrigerating a supply of the stripped, volatile liquid, and contacting the mixture with the refrigerated supply; said refrigerating step comprising refrigerating the supply of stripped, volatile liquid in a chiller into which a refrigerant is admitted to effect the refrigeration; and further includes
   heat exchanging a supply of fluid with the stripped, volatile liquid to cool the fluid; and
   cooling the refrigerant, prior to admittance thereof into the chiller, by heat exchanging the refrigerant with the heat-exchanged, cooled fluid.

13. A method, according to claim 12, wherein:
   the fluid comprises a vaporous, volatile liquid.

14. A method, according to claim 1, further including the step of:
   admixing air, from which vapor has been stripped and recovered, with the air-vapor mixture which is subsequently to have the vapors stripped and recovered therefrom.

15. A method, according to claim 14, wherein said air-vapor mixture and vapor-stripped air admixing step is performed prior to the contacting of the air-vapor mixture with the stream of stripped, volatile liquid.

16. Apparatus for stripping and recovering vapors from an air-vapor mixture, generated by a vaporous, volatile liquid which is exposed to air, comprising:
   means for producing a flow of the vaporous, volatile liquid;
   means for stripping vapors from the flowing liquid; and
   means for contacting the mixture with the vapor-stripped liquid to cause vapors to be stripped from the mixture and become absorbed by the liquid, including means for conducting the liquid from said flow-producing means to said liquid-vapors stripping means; and
   means for conducting the vapor-stripped liquid from said liquid-vapors stripping means to said contacting means; and
   further including means for cooling said mixture to effect condensation of the vapors thereof; wherein
   said liquid-vapors stripping means comprises means for generating a vapor spray of said volatile liquid, and means for admixing said air-vapor mixture with said spray of said volatile liquid, to strip said liquid spray of vapor and give up stripped vapor to said mixture to render the mixture more saturated.

17. Apparatus, according to claim 16, wherein:
   said cooling means comprises means for cooling the flowing liquid, prior to contact thereof with the mixture, including means for conducting the vapor-stripped liquid from said liquid-vapors stripping means to said liquid cooling means, and from said liquid cooling means to said contacting means.

18. Apparatus, according to claim 16, wherein:
   said contacting means includes means for collecting vapor condensate.

19. Apparatus, according to claim 16, wherein:

said cooling means comprises refrigerating means, and means for effecting a contact of said air-vapor mixture with said refrigerating means.

20. Apparatus, according to claim 16, wherein:
said admixing means further includes means for separating the vapor-receiving, more-saturated mixture from the stripped spray.

21. Apparatus, according to claim 20, wherein:
said separating means includes means for separating said more-saturated mixture from said stripped spray before said more-saturated mixture is conducted to said cooling means.

22. Apparatus, according to claim 16, wherein:
said cooling means comprises a supply of said volatile liquid, and means for refrigerating said supply; and
said contacting means includes means for contacting said mixture with said refrigerated supply.

23. Apparatus, according to claim 22, wherein:
said refrigerating means comprises a chiller having means for admitting a refrigerant medium thereinto to effect refrigeration; and further includes
means for cooling said medium prior to admittance thereof into said chiller.

24. Apparatus for stripping and recovering vapors from an air-vapor mixture, generated by a vaporous, volatile liquid which is exposed to air, comprising:
means for producing a flow of the vaporous, volatile liquid;
means for stripping vapors from the flowing liquid; and
means for contacting the mixture with the vapor-stripped liquid to cause vapors to be stripped from the mixture and become absorbed by the liquid, including means for conducting the liquid from said flow-producing means to said liquid-vapors stripping means; and
means for conducting the vapor-stripped liquid from said liquid-vapors stripping means to said contacting means; and
further including means for cooling said mixture to effect condensation of the vapors thereof; wherein
said cooling means comprises refrigerating means, and means for effecting a contact of said air-vapor mixture with said refrigerating means; and wherein
said means for effecting a contact of said air-vapor mixture with said refrigerating means comprises means for passing said mixture and a refrigerated absorbent through each other, and includes means for moving said mixture in a predetermined direction, and means for moving said absorbent in a direction other than said predetermined direction.

25. Apparatus for stripping and recovering vapors from an air-vapor mixture, generated by a vaporous, volatile liquid which is exposed to air, comprising:
means for producing a flow of the vaporous, volatile liquid;
means for stripping vapors from the flowing liquid; and
means for contacting the mixture with the vapor-stripped liquid to cause vapors to be stripped from the mixture and become absorbed by the liquid, including means for conducting the liquid from said flow-producing means to said liquid-vapors stripping means; and
means for conducting the vapor-stripped liquid from said liquid-vapors stripping means to said contacting means; and
further including means for cooling said mixture to effect condensation of the vapors thereof; wherein
said cooling means comprises refrigerating means, and means for effecting a contact of said air-vapor mixture with said refrigerating means; and wherein
said means for effecting a contact of said air-vapor mixture with said refrigerating means comprises means for passing said mixture and a refrigerated absorbent through each other in counter-flow directions.

26. Apparatus for stripping and recovering vapors from air-vapor mixture, generated by a vaporous, volatile liquid which is exposed to air, comprising:
means for producing a flow of the vaporous, volatile liquid;
means for stripping vapors from the flowing liquid; and
means for contacting the mixture with the vapor-stripped liquid to cause vapors to be stripped from the mixture and become absorbed by the liquid, including means for conducting the liquid from said flow-producing means to said liquid-vapors stripping means; and
means for conducting the vapor-stripped liquid from said liquid-vapors stripping means to said contacting means; and further including
admittance means cooperative with said contacting means for admixing at least a portion of air, from which vapor has been stripped, with air-vapor mixture which is subsequently to have the vapors stripped therefrom.

27. Apparatus, according to claim 26, wherein:
said flow-producing means comprises a jet inductor;
said conducting means comprises a first conduit through-connected with said inductor for admitting said mixture to said inductor; and
said admixing, admittance means comprises a second conduit through-connected with said inductor for admitting said vapor-stripped air to said jet inductor.

28. A method of stripping and recovering vapors from an air-vapor mixture generated by a vaporous, volatile liquid which is exposed to the air, comprising the steps of:
stripping a vaporous, volatile liquid of at least some of its vapors; and
contacting the mixture with a stream of the stripped, volatile liquid, to cause the mixture to give up vapors to the stripped, volatile liquid; wherein
said liquid stripping step comprises vaporizing at least a portion of said liquid and extracting said vaporized portion;
further including the step of condensing the vaporized portion of said liquid; and wherein
said condensing step comprises pressurizing said vaporized portion to cause said portion to condense.

29. Apparatus for stripping and recovering vapors from an air-vapor mixture, generated by a vaporous, volatile liquid which is exposed to air, comprising:
means for producing a flow of the vaporous, volatile liquid;
means for stripping vapors from the flowing liquid; and
means for contacting the mixture with the vapor-stripped liquid to cause vapors to be stripped from the mixture and become absorbed by the liquid, including means for conducting the liquid from said flow-producing means to said liquid-vapors stripping means; and means for conducting the vapor-stripped liquid from said liquid-vapors stripping means to said contacting means; wherein said means for vapor-stripping said liquid comprises means for vaporizing at least a portion of said liquid and extracting said vaporized portion; further including means throughconnected with said vaporizing means for condensing said vaporized portion of said liquid; and wherein said condensing means comprises means for pressurizing said vaporized portion to cause said portion to condense.

30. Apparatus for stripping and recovering vapors from an air-vapor mixture, generated by a vaporous, volatile liquid which is exposed to air, comprising:

means for producing a flow of the vaporous, volatile liquid;

means for stripping vapors from the flowing liquid; and means for contacting the mixture with the vapor-stripped liquid to cause vapors to be stripped from the mixture and become absorbed by the liquid, including means for conducting the liquid from said flow-producing means to said liquid-vapors stripping means; and means for conducting the vapor-stripped liquid from said liquid-vapors stripping means to said contacting means; wherein said means for vapor-stripping said liquid comprises means for vaporizing at least a portion of said liquid and extracting said vaporized portion; and said vaporizing means comprises means for boiling said liquid to cause vaporization of said portion; further including means for condensing said vaporized portion of said liquid; and wherein said condensing means comprises means for pressurizing said vaporized portion to cause said portion to condense.

31. A method of vapor-stripping a vaporous, volatile liquid, comprising the steps of:

vaporizing at least a portion of said liquid; and extracting said vaporized portion from a residual non-vaporized portion; wherein said vaporizing step comprises boiling said liquid to cause vaporization of said portion; futher including the step of condensing the vaporized portion; and wherein said condensing step comprises pressurizing said vaporized portion to cause said portion to condense; and further including the step of heat exchanging both said vaporized and said non-vaporized portions of said liquid with vaporous, volatile liquid which is to be stripped of vapors.

* * * * *